United States Patent
Chang et al.

(10) Patent No.: US 6,535,974 B1
(45) Date of Patent: Mar. 18, 2003

(54) DEVICE AND METHOD FOR NONINVASIVE, USER REPLACEMENT OF AN INOPERABLE BOOT PROGRAM

(75) Inventors: Yung-Fu Chang, Medina, OH (US); Randal A. Leeson, Stow, OH (US)

(73) Assignee: Accelent Systems Inc., Fairlawn, OH (US)

( * ) Notice: Subject to any disclaimer, the term of this patent is extended or adjusted under 35 U.S.C. 154(b) by 0 days.

(21) Appl. No.: 09/336,411

(22) Filed: Jun. 18, 1999

(51) Int. Cl.[7] .................................................. G06F 3/00
(52) U.S. Cl. .......................... 713/1; 713/100; 709/220; 710/104
(58) Field of Search .............................. 713/1, 2, 100; 709/220, 221, 222; 711/162; 710/8.13, 101–104, 10; 712/15

(56) References Cited

U.S. PATENT DOCUMENTS

| | | | | |
|---|---|---|---|---|
| 5,093,915 A | * | 3/1992 | Platteter et al. ............. 395/700 |
| 5,136,711 A | * | 8/1992 | Hugard et al. ............... 395/700 |
| 4,030,073 A | * | 6/1997 | Armstrong, Jr. ......... 340/172.5 |
| 5,727,213 A | * | 3/1998 | Vaner Kamp et al. ...... 709/301 |
| 5,771,064 A | * | 6/1998 | Lett ............................. 348/10 |
| 5,899,987 A | * | 5/1999 | Yarom ........................... 707/3 |
| 6,012,142 A | * | 1/2000 | Dokic et al. ................... 713/2 |
| 6,098,158 A | * | 8/2000 | Lay et al. .................... 711/162 |
| 6,490,722 B1 | * | 12/2002 | Barton et al. ............... 717/174 |

* cited by examiner

Primary Examiner—Jeffrey Gaffin
Assistant Examiner—RiJue Mai
(74) Attorney, Agent, or Firm—Howard S. Robbins

(57) ABSTRACT

A device (10) for user replacement of an inoperable, first boot loader program includes a boot memory (20) including the first boot loader program beginning at a first address, a PCMCIA card (15) including a second boot loader program beginning at a second memory address, and a selector switch (12). Selector switch (12) receives the user selection of one of the first boot loader program and the second boot loader program, and generates a selection signal corresponding to the user selected boot loader program. Combinational logic (21) receiving the selection signal, enables the selected boot loader program and disabling the other boot loader program.

8 Claims, 2 Drawing Sheets

DEVICE AND METHOD FOR NONINVASIVE, USER REPLACEMENT OF AN INOPERABLE BOOT PROGRAM

TECHNICAL FIELD

The present invention relates in general to boot programs in electronic devices such as digital computers which include one or more processors that utilize programs stored in memory to commence operation. More particularly, the present invention pertains to replacement of an inoperable boot program. More specifically, the present invention relates to a device and method for replacement of an inoperable boot program without physical access to and removal of the memory in which is stored the inoperable boot program.

BACKGROUND ART

In order for electronic devices such as digital computers which include one or more processors that utilize programs stored in memory to commence operation, it is necessary upon initial powerup to automatically load sufficient instructions to enable the device to perform basic input and output tasks, and locate and load the remainder of its operating system. These relatively minimal instructions are commonly referred to with a variety of names, such as the boot program, boot loader or flash kernel. The boot program must be stored in nonvolatile memory, such as a read only memory (hereinafter, "boot ROM"), in a block (often called the "boot record") beginning at a preselected address so that upon initial powerup hardware circuitry can locate and load the boot program for processor execution.

If the boot program cannot be successfully loaded for processor execution, the computer cannot proceed with any further operation. If such inoperability is due to corruption of the boot program or other boot ROM malfunction, heretofore operation could be restored only by replacement of the boot ROM. Since the boot ROM is nearly universally included on the computer main or daughter board, time consuming and labor intensive physical disassembly of the computer by a skilled technician was required before proper operation could be restored. This made repair costly and, in some instances, economically prohibitive.

SUMMARY OF THE INVENTION

It is, therefore, an object of the present invention to provide a device and method for replacement of an inoperable boot program.

It is another object of the present invention to provide a device and method for replacement of an inoperable boot program without physical access to, or removal of, the memory including the inoperable boot program.

It is still another object of the present invention to provide a device and method for replacement of an inoperable boot program without the need for a skilled technician.

It is yet another object of the present invention to provide a device and method for replacement of an inoperable boot program that is simple to operate and may be performed by the user.

These and other objects and advantages of the present invention over existing prior art forms will become more apparent and fully understood from the following description in conjunction with the accompanying drawings.

In general, a device for user replacement of an inoperable, first boot loader program includes a boot memory including the first boot loader program beginning at a first address, an external memory including a second boot loader program beginning at a second memory address, a switch for receiving user selection of one of the first boot loader program and the second boot loader program and generating a selection signal corresponding to the user selected boot loader program, and combinational logic receiving the selection signal, enabling the selected boot loader program and disabling the other boot loader program.

A method for user replacement of an inoperable, first boot loader program in a boot memory of a device, including the steps of operatively associating with the device an external memory including a second boot loader program beginning at a second memory address, actuating a switch to select the second boot loader program and generating at least one signal enabling the selected boot loader program and disabling the other boot loader program.

PREFERRED EMBODIMENT FOR CARRYING OUT THE INVENTION

Figure 1:
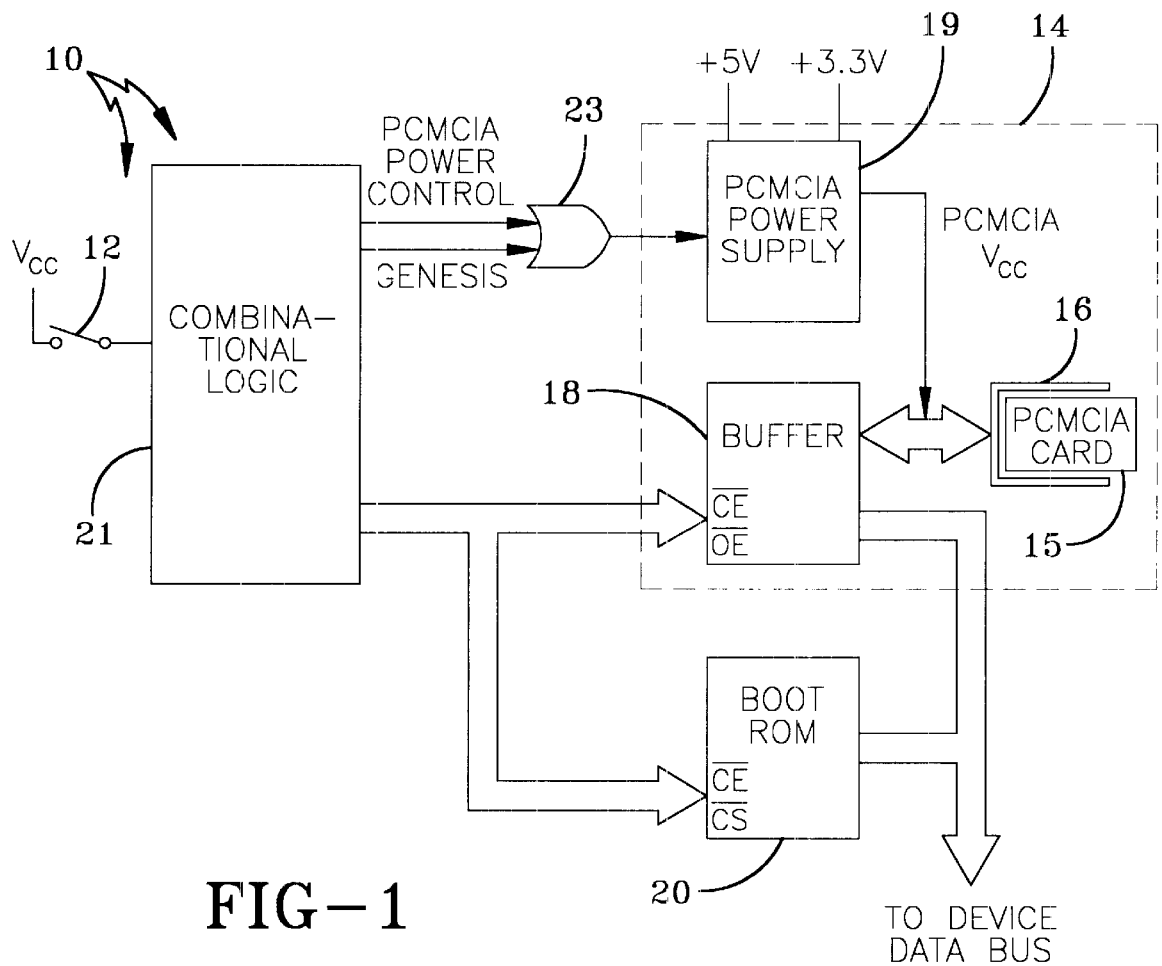
FIG. 1 is a block diagram of an exemplary device for replacement of an inoperable boot program without physical access to, or removal of, the memory including the inoperable boot program in accordance with the present invention.

FIG. 1 presents a block diagram of an exemplary device in accordance with the present invention, indicated generally with the numeral 10, for replacement of an inoperable boot program without physical access to, or removal of, the memory in which is stored the inoperable boot program. Device 10 generally includes a selector switch 12, user connectable external memory 14 (such as a PCMCIA card 15, a PCMCIA card socket 16 receiving PCMCIA card 15 and communicating with a level translation buffer 18, and a PCMCIA card power supply 19), boot ROM 20 and combinational logic 21. Selector switch 12, external memory 14 and combinational logic 21 collectively may be called the "genesis logic".

Selector switch 12 may be any conventional maintained contact switch for pulling the logic level of elements within combinational logic 17 to the desired logic level for effecting replacement of an inoperable boot program in accordance with the present invention. Selector switch 12 is shown with one end electrically connected to $V_{cc}$ and the other end electrically connected to certain elements within combinational logic 17.

External memory 14 may be any external memory that the user may place in operable association with the data bus of device 10 without having to physically open any housing for device 10. A PCMCIA card (now sometimes also called a "PC Card") conforming to the specification of the Personal Computer Memory Card International Association ("PCMCIA") of Sunnyvale, Calif. is an excellent candidate for external memory 14 because of its simplicity, wide acceptance and availability, low cost and user convenience. As is well known to the ordinarily skilled artisan, output of all or a select content of PCMCIA card 15 to the computer's operating memory is accomplished by selective and appropriate application of signals of the necessary logic level to the chip enable ("CE") and output enable ("OE") inputs to level translation buffer 18.

Boot ROM 20 may be any nonvolatile memory suitable for storage of the boot record. As is well known to the ordinarily skilled artisan, output of the boot record from the boot ROM to the computer's operating memory is accomplished by selective and appropriate application of signals of the necessary logic level to the chip select ("CS") and output enable ("OE") inputs to the boot ROM memory.

Combinational logic 21 may be any combination of logic elements such as flip-flops and gates necessary to apply the appropriate signal levels to the chip enable, chip select and output enable inputs to buffer 18 and boot ROM 20. Combinational logic 21 may further include one or more logic element such as OR gate 23 to actuate PCMCIA Power Supply 19 whenever conventional operation of PCMCIA card 15 is called for, or when an inoperable boot program is to be replaced, as explained further hereinafter.

Figure 2:
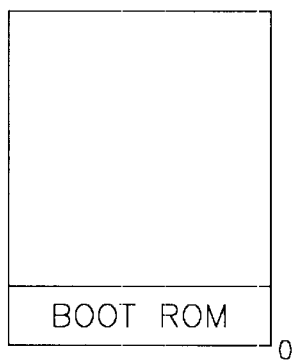
FIG. 2 is a memory map of a conventional prior art device in which the boot record in the boot ROM is assigned to the lowest block of memory beginning with address h0000.
Figure 3:
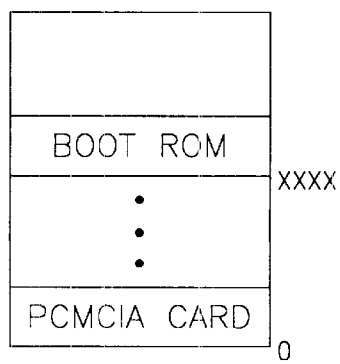
FIG. 3 is a memory map in accordance with the present invention in which the boot record in the PCMCIA Card is assigned to the lowest block of memory beginning with address h0000, and the boot record in the boot ROM is assigned to a higher block of memory beginning with address hXXXX.

Operation of the present invention may be best understood by reference first to FIG. 2, where a memory map of a conventional prior art computer system is presented, and FIG. 3, where an exemplary memory map in accordance with the present invention is depicted. In FIG. 2, a conventional prior art computer system can be seen to load the boot program in a block at the lowest address in operational memory. The hardware design of most digital computers decode, load and begin execution of the boot program at address h0000. Thus, if the content of the boot record block in boot ROM 20 is or becomes corrupt, the computer is unable to bootstrap its operation. In this event the computer must be physically opened and the boot ROM 20 integrated circuits removed and replaced.

However, in the instance of the present invention and the memory map of FIG. 3, the boot ROM block can be seen to have been moved to begin a higher address (hXXXX), and the boot record block of the PCMCIA card 15 assigned to the lowest memory block. In normal operation the boot ROM 20 boot program is mapped to address h0000. Once selector switch 12 is actuated, device 10 runs an optional diagnostic check on the boot record memory block beginning at the lowest address, and, if bad, combinational logic 21 deselects boot ROM 20, actuates power to PCMCIA card socket 16, and copies the boot program from PCMCIA card 15 to the memory block at the lowest address in operational memory. Once complete, selector switch 12 is pressed again to return to its normally open configuration, whereupon an operational boot record is now restored to computer operational memory.

Figure 4:
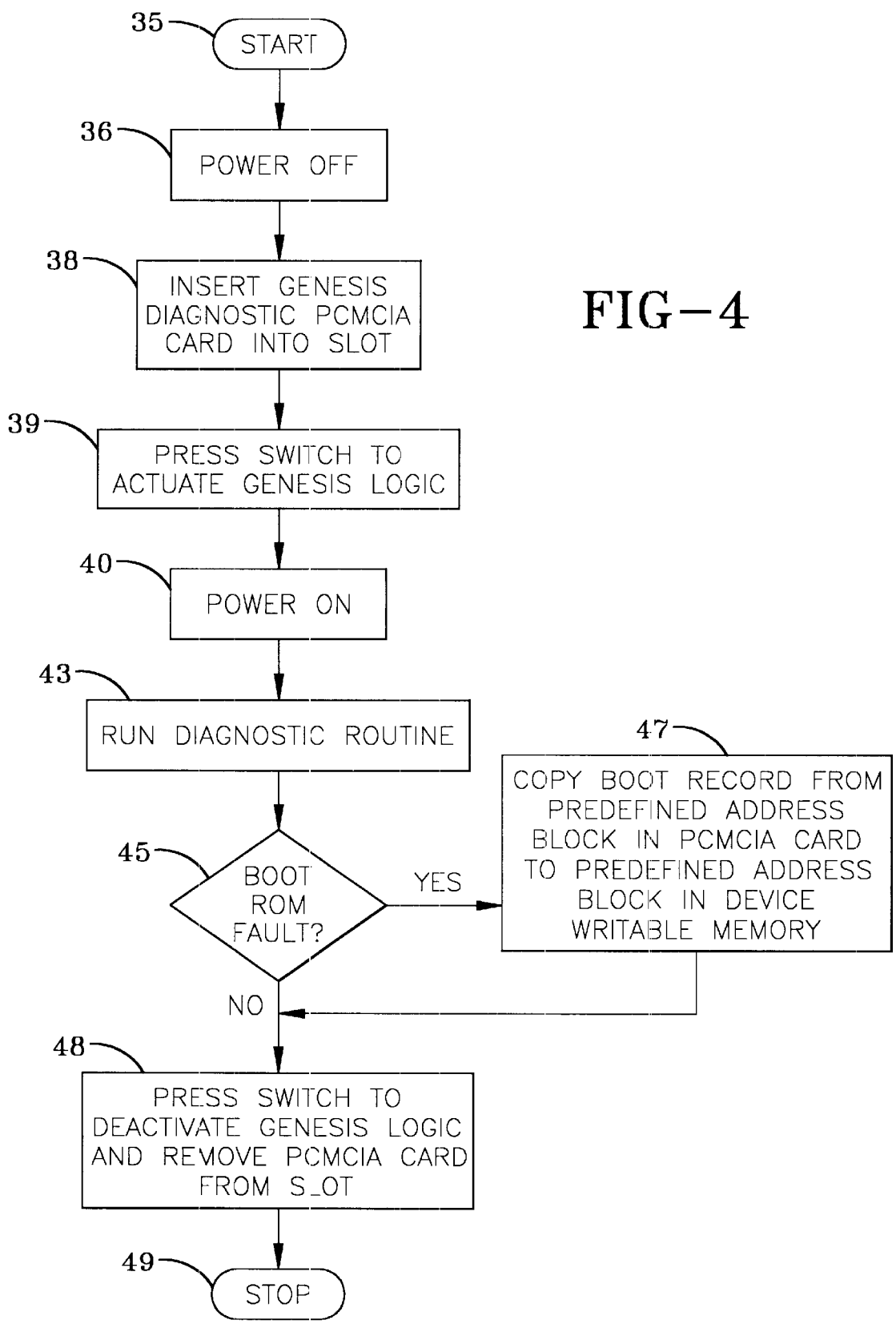
FIG. 4 is a top-level flow chart of an exemplary method for replacement of an inoperable boot program without physical access to, or removal of, the memory including the inoperable boot program in accordance with the present invention.

FIG. 4 shows a more detailed, but still top-level flow chart of an exemplary method in accordance with the present invention for replacement of an inoperable boot program without physical access to, or removal of, the memory in which is stored the inoperable boot program. The method begins at start block 35 with the power off at block 36. Next, in step 38 PCMCIA card 15, which may be called the genesis diagnostic PCMCIA card including a replacement boot record and some diagnostic software, is inserted into and seated in PCMCIA card socket 16. Selector switch is pressed in step 39 to powerup PCMCIA card 15, and in step 40 computer power is turned on.

A diagnostic routine is run in step 43 on the boot record memory block beginning at the lowest address, and a test performed in step 45. If the boot record is corrupt or otherwise inoperable, in step 47 an operable boot record is copied from a predefined address block in PCMCIA card 15 to a predefined address block in the computer's writable memory. Therafter, and in the event no boot ROM fault is found, selector switch 12 is pressed in step 48 to deactivate the gensis logic, and the PCMCIA card 15 is removed from PCMCIA card socket 16, whereupon the method stops in step 49.

One of ordinary skill should now appreciate that a diagnostic routine is not essential to the successful replacement of the boot record, and may, where desired, not be included.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of restoring an inoperable boot record without having to physically access the integrated circuits chips containing the boot program.

What is claimed is:

1. A device for user replacement of an inoperable, first boot loader program, comprising:

boot memory including the first boot loader program beginning at a first address;

external memory including a second boot loader program beginning at a second memory address;

a switch for receiving user selection of one of said first boot loader program and said second boot loader program and generating a selection signal corresponding to said user selected boot loader program; and, combinational logic receiving said selection signal enabling said selected boot loader program and disabling the other said boot loader program.

2. A device, as set forth in claim 1, wherein said external memory is a PCMCIA card.

3. A device, as set forth in claim 2, wherein said external memory further includes a PCMCIA power supply and a buffer, said combinational logic actuating said power supply, enabling said buffer, and disabling said boot memory upon user selection of said second boot loader program.

4. A device, as set forth in claim 3, wherein said combinational logic disabling said buffer and enabling said boot memory upon user selection of said first boot loader program.

5. A method for user replacement of an inoperable, first boot loader program in a boot memory of a device, comprising the steps of:

operatively associating with the device an external memory including a second boot loader program beginning at a second memory address;

actuating a switch to select said second boot loader program; and, generating at least one signal enabling said selected boot loader program and disabling the other said boot loader program.

6. A method, as set forth in claim 5, wherein said step of operatively associating with the device an external memory includes the step of operatively associating with the device a PCMCIA card.

7. A method, as set forth in claim 6, further including the further steps of selectively actuating a PCMCIA power supply, enabling a PCMCIA buffer, and disabling the boot memory.

8. A method, as set forth in claim 7, further including the steps of selectively disabling said PCMCIA buffer and enabling said boot memory.

* * * * *